United States Patent
Huang et al.

(10) Patent No.: US 11,924,140 B2
(45) Date of Patent: Mar. 5, 2024

(54) SUBBAND CHANNEL QUALITY INFORMATION

(71) Applicant: QUALCOMM Incorporated, San Diego, CA (US)

(72) Inventors: Yi Huang, San Diego, CA (US); Wanshi Chen, San Diego, CA (US); Wei Yang, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 17/451,391

(22) Filed: Oct. 19, 2021

(65) Prior Publication Data

US 2022/0123908 A1  Apr. 21, 2022

Related U.S. Application Data

(60) Provisional application No. 63/198,468, filed on Oct. 21, 2020.

(51) Int. Cl.
*H04L 5/00* (2006.01)
*H04W 72/044* (2023.01)
*H04W 72/542* (2023.01)

(52) U.S. Cl.
CPC .......... *H04L 5/0057* (2013.01); *H04L 5/0051* (2013.01); *H04W 72/044* (2013.01); *H04W 72/542* (2023.01)

(58) Field of Classification Search
CPC .. H04B 7/0621; H04B 7/0626; H04B 7/0632; H04B 7/0658; H04B 7/066; H04L 1/0687; H04L 1/0693; H04L 5/0051; H04L 5/0057; H04W 72/0413; H04W 72/042; H04W 72/044; H04W 72/1231
See application file for complete search history.

(56) References Cited

U.S. PATENT DOCUMENTS

| | | | |
|---|---|---|---|
| 2010/0329134 A1* | 12/2010 | Doppler | H04L 1/0029 370/252 |
| 2015/0009924 A1* | 1/2015 | Takano | H04W 24/10 370/329 |
| 2018/0278301 A1* | 9/2018 | Kim | H04B 7/0695 |
| 2019/0199420 A1* | 6/2019 | Faxér | H04W 72/0413 |
| 2020/0358502 A1* | 11/2020 | Faxér | H04W 24/10 |
| 2021/0391967 A1* | 12/2021 | Gao | H04L 5/0035 |

* cited by examiner

*Primary Examiner* — Pao Sinkantarakorn
*Assistant Examiner* — Pawaris Sinkantarakorn
(74) *Attorney, Agent, or Firm* — Harrity & Harrity, LLP

(57) ABSTRACT

Various aspects of the present disclosure generally relate to wireless communication. In some aspects, a user equipment (UE) may receive a plurality of reference signals on a plurality of reference signal resources, wherein the plurality of reference signal resources span a plurality of subbands associated with the UE. The UE may determine, for the plurality of subbands, respective selected CSI reports from a set of CSI reports based at least in part on the plurality of reference signals. The UE may transmit information indicating a subset of the respective selected CSI reports. Numerous other aspects are provided.

30 Claims, 8 Drawing Sheets ured by one or more processors of a UE, cause the UE to: receive a plurality of reference signals on a plurality of reference signal resources, wherein a reference signal resource of the plurality of reference signal resources spans a plurality of subbands associated with the UE, and wherein the plurality of reference signal resources are distributed in time; and transmit, for the plurality of subbands, a subset of respective selected CSI reports, wherein the respective selected CSI reports are selected based at least in part on the plurality of reference signals.

SUBBAND CHANNEL QUALITY INFORMATION

CROSS-REFERENCE TO RELATED APPLICATION

This Patent Application claims priority to U.S. Provisional Patent Application No. 63/198,468, filed on Oct. 21, 2020, entitled "SUBBAND CHANNEL QUALITY INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for providing subband channel quality information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a plurality of reference signals on a plurality of reference signal resources, wherein a reference signal resource of the plurality of reference signal resources spans a plurality of subbands associated with the UE, and wherein the plurality of reference signal resources are distributed in time; and transmitting, for the plurality of subbands, a subset of respective selected channel state information (CSI) reports, wherein the respective selected CSI reports are selected based at least in part on the plurality of reference signals.

In some aspects, a method of wireless communication performed by a transmitter includes transmitting, to a UE, a plurality of reference signals on a plurality of reference signal resources, wherein a reference signal resource of the plurality of reference signal resources spans a plurality of subbands associated with the UE, and wherein the plurality of reference signal resources are distributed in time; receiving a subset of CSI reports selected from a set of CSI reports associated with the plurality of reference signal resources; and performing a communication based at least in part on the subset of CSI reports.

In some aspects, an apparatus for wireless communication at a user equipment (UE) includes a memory; and one or more processors, coupled to the memory, configured to: receive a plurality of reference signals on a plurality of reference signal resources, wherein a reference signal resource of the plurality of reference signal resources spans a plurality of subbands associated with the UE, and wherein the plurality of reference signal resources are distributed in time; and transmit, for the plurality of subbands, a subset of respective selected CSI reports, wherein the respective selected CSI reports are selected based at least in part on the plurality of reference signals.

In some aspects, an apparatus for wireless communication at a transmitter includes a memory; and one or more processors, coupled to the memory, configured to: transmit, to a UE, a plurality of reference signals on a plurality of reference signal resources, wherein a reference signal resource of the plurality of reference signal resources spans a plurality of subbands associated with the UE, and wherein the plurality of reference signal resources are distributed in time; receive a subset of CSI reports selected from a set of CSI reports associated with the plurality of reference signal resources; and perform a communication based at least in part on the subset of CSI reports.

In some aspects, a non-transitory computer-readable medium storing a set of instructions for wireless communication includes one or more instructions that, when executed by one or more processors of a UE, cause the UE to: receive a plurality of reference signals on a plurality of reference signal resources, wherein a reference signal resource of the plurality of reference signal resources spans a plurality of subbands associated with the UE, and wherein the plurality of reference signal resources are distributed in time; and transmit, for the plurality of subbands, a subset of respective selected CSI reports, wherein the respective selected CSI reports are selected based at least in part on the plurality of reference signals.

In some aspects, a non-transitory computer-readable medium storing a set of instructions for wireless communication includes one or more instructions that, when executed by one or more processors of a transmitter, cause the transmitter to: transmit, to a UE, a plurality of reference signals on a plurality of reference signal resources, wherein a reference signal resource of the plurality of reference signal resources spans a plurality of subbands associated with the UE, and wherein the plurality of reference signal resources are distributed in time; receive a subset of CSI reports selected from a set of CSI reports associated with the plurality of reference signal resources; and perform a communication based at least in part on the subset of CSI reports.

In some aspects, an apparatus for wireless communication includes means for receiving a plurality of reference signals on a plurality of reference signal resources, wherein a reference signal resource of the plurality of reference signal resources spans a plurality of subbands associated with the apparatus, and wherein the plurality of reference signal resources are distributed in time; and means for transmitting, for the plurality of subbands, a subset of respective selected CSI reports, wherein the respective selected CSI reports are selected based at least in part on the plurality of reference signals.

In some aspects, an apparatus for wireless communication includes means for transmitting, to a UE, a plurality of reference signals on a plurality of reference signal resources, wherein a reference signal resource of the plurality of reference signal resources spans a plurality of subbands associated with the UE, and wherein the plurality of reference signal resources are distributed in time; means for receiving a subset of CSI reports selected from a set of CSI reports associated with the plurality of reference signal resources; and means for performing a communication based at least in part on the subset of CSI reports.

In some aspects, a method of wireless communication performed by a user equipment (UE) includes receiving a plurality of reference signals on a plurality of reference signal resources, wherein the plurality of reference signal resources span a plurality of subbands associated with the UE; determining, for the plurality of subbands, respective selected CSI reports from a set of CSI reports based at least in part on the plurality of reference signals; and transmitting information indicating a subset of the respective selected CSI reports.

In some aspects, a method of wireless communication performed by a transmitter includes transmitting a plurality of reference signals on a plurality of reference signal resources, wherein the plurality of reference signal resources span a plurality of subbands; receiving information indicating a subset of CSI reports associated with the plurality of reference signals and the plurality of subbands; and performing a communication based at least in part on the subset of CSI reports.

In some aspects, a UE for wireless communication includes a memory and one or more processors coupled to the memory, the memory and the one or more processors configured to: receive a plurality of reference signals on a plurality of reference signal resources, wherein the plurality of reference signal resources span a plurality of subbands associated with the UE; determine, for the plurality of subbands, respective selected CSI reports from a set of CSI reports based at least in part on the plurality of reference signals; and transmit information indicating a subset of the respective selected CSI reports.

In some aspects, a non-transitory computer-readable medium storing a set of instructions for wireless communication includes one or more instructions that, when executed by one or more processors of a UE, cause the UE to: receive a plurality of reference signals on a plurality of reference signal resources, wherein the plurality of reference signal resources span a plurality of subbands associated with the UE; determine, for the plurality of subbands, respective selected CSI reports from a set of CSI reports based at least in part on the plurality of reference signals; and transmit information indicating a subset of the respective selected CSI reports.

In some aspects, an apparatus for wireless communication includes means for receiving a plurality of reference signals on a plurality of reference signal resources, wherein the plurality of reference signal resources span a plurality of subbands associated with the apparatus; means for determining, for the plurality of subbands, respective selected CSI reports of a set of CSI reports based at least in part on the plurality of reference signals; and means for transmitting information indicating a subset of the respective selected CSI reports.

In some aspects, a transmitter for wireless communication includes a memory and one or more processors coupled to the memory, the memory and the one or more processors configured to: transmit a plurality of reference signals on a plurality of reference signal resources, wherein the plurality of reference signal resources span a plurality of subbands; receive information indicating a subset of CSI reports associated with the plurality of reference signals and the plurality of subbands; and perform a communication based at least in part on the subset of CSI reports.

In some aspects, a non-transitory computer-readable medium storing a set of instructions for wireless communication includes one or more instructions that, when executed by one or more processors of a transmitter, cause the transmitter to: transmit a plurality of reference signals on a plurality of reference signal resources, wherein the plurality of reference signal resources span a plurality of subbands; receive information indicating a subset of CSI reports associated with the plurality of reference signals and the plurality of subbands; and perform a communication based at least in part on the subset of CSI reports.

In some aspects, an apparatus for wireless communication includes means for transmitting a plurality of reference signals on a plurality of reference signal resources, wherein the plurality of reference signal resources span a plurality of subbands; means for receiving information indicating a subset of CSI reports associated with the plurality of reference signals and the plurality of subbands; and means for performing a communication based at least in part on the subset of CSI reports.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
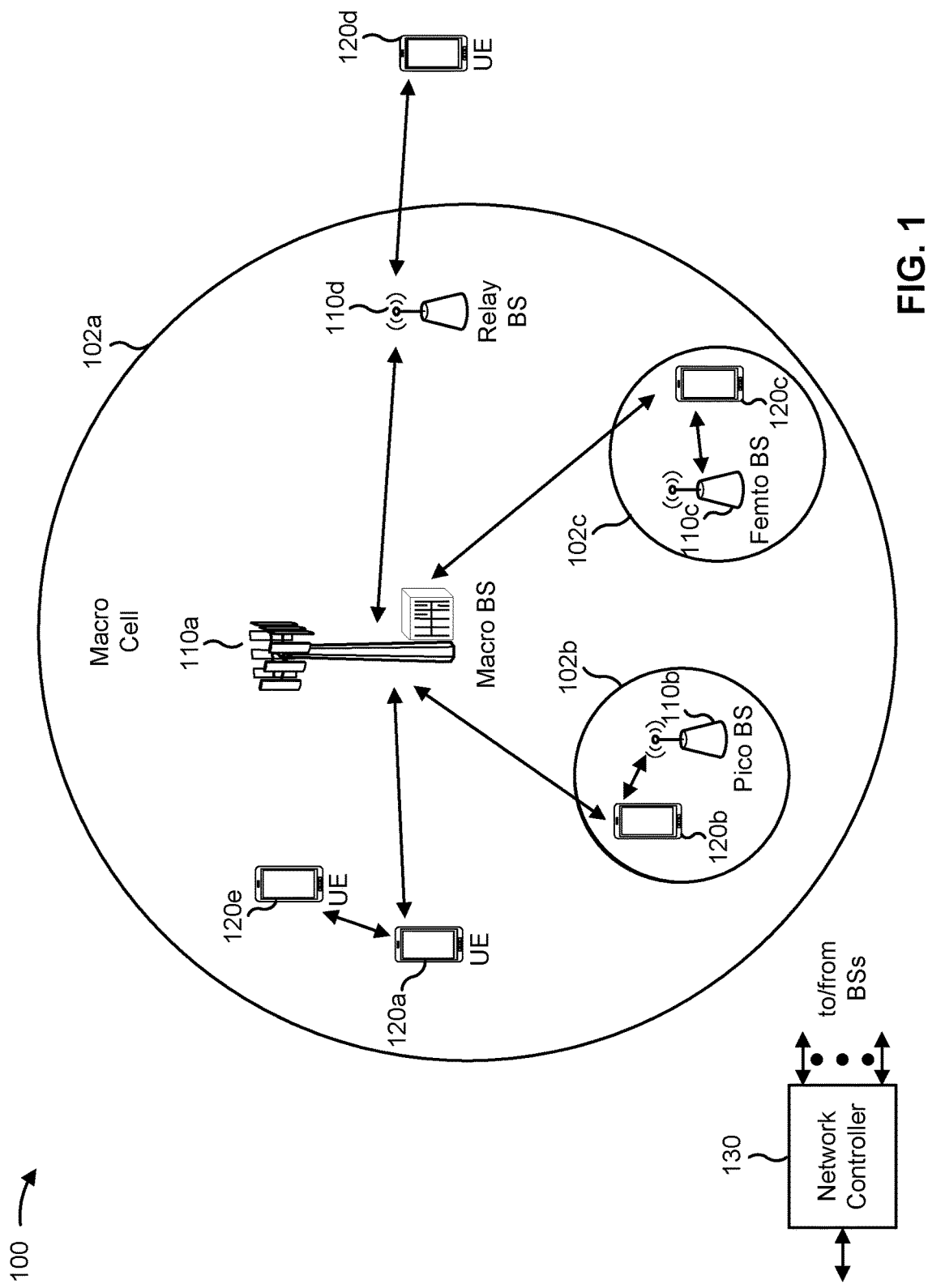
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
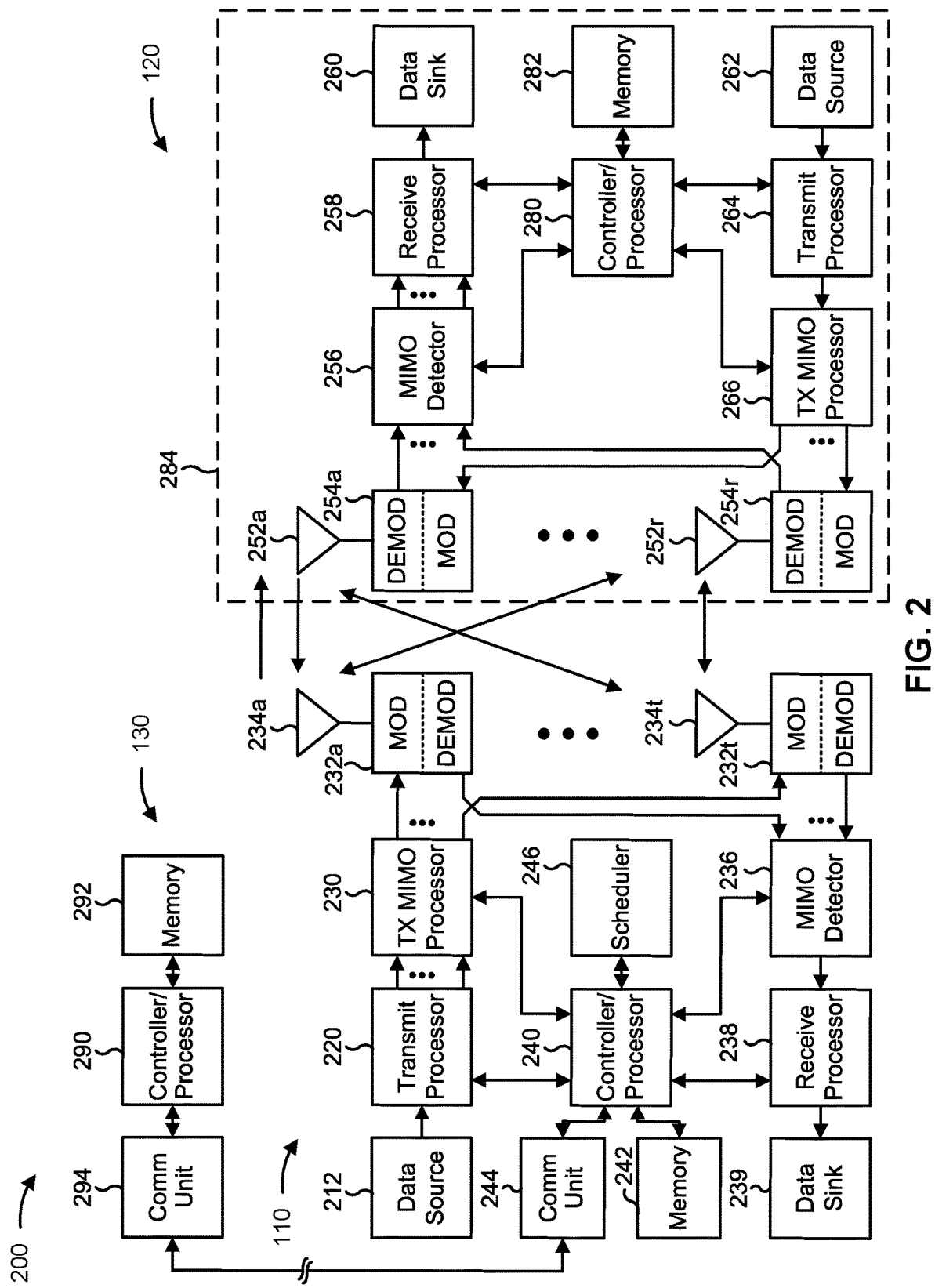
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with providing subband channel quality information, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, a UE 120 includes means for receiving a plurality of reference signals on a plurality of reference signal resources, wherein a reference signal resource of the plurality of reference signal resources spans a plurality of subbands associated with the UE 120, and wherein the plurality of reference signal resources are distributed in time; and/or means for transmitting, for the plurality of subbands, a subset of respective selected CSI reports, wherein the respective selected CSI reports are selected based at least in part on the plurality of reference signals. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a transmitter (e.g., BS 110) includes means for transmitting, to a UE, a plurality of reference signals on a plurality of reference signal resources, wherein a reference signal resource of the plurality of reference signal resources spans a plurality of subbands associated with the UE, and wherein the plurality of reference signal resources are distributed in time; means for receiving a subset of CSI reports selected from a set of CSI reports associated with the plurality of reference signal resources; and/or means for performing a communication based at least in part on the subset of CSI reports. In some aspects, the means for the transmitter to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may conduct communication with a BS in a wireless network such as an LTE network or a 5G/NR network. The communication may include downlink communications from the BS to the UE and may include uplink communications from the UE to the BS. The communication may take place over a frequency range which may be referred to as wideband. In one example, a wideband may include the operating bandwidth of a UE. The wideband may be subdivided, based on frequency and/or wavelength considerations, into a plurality of subbands. Each of the plurality of subbands, in turn, may contain a respective plurality of subcarriers. Subcarriers may be grouped into physical resource blocks (PRBs).

During the communication, the UE may report channel status information (CSI) associated with the wideband and/or the plurality of subbands. For instance, a measure of quality associated with the communication may vary over time due to, for example, varying environmental conditions. The UE may determine CSI feedback based at least in part on a channel state information reference signal (CSI-RS), which may be associated with a configured resource known as a CSI-RS resource. A CSI-RS resource may be identified by a CSI-RS resource indicator (CRI). In some aspects, multiple CSI-RS resources may be configured for the UE, and may be distributed in time. The UE may report CSI to the BS to enable the BS to perform link adaptation, scheduling, or the like. The CSI may include a channel quality indicator (CQI) that informs the BS of an effective channel quality at the UE based on, for example, a measured signal-to-interference-plus-noise ratio (SINR) at the UE. The CQI may also indicate to the BS a suitable downlink transmission data rate and/or a suitable modulation and coding scheme to be used by the BS to transmit the downlink data to enable the UE to adequately receive and decode the downlink data. In some aspects, the CSI may include a rank indicator (RI), a precoding matrix indicator (PMI), or the like.

In some deployments, the UE may determine and report respective CQIs for each PRB within each of the plurality of subbands. Reporting the respective CQIs may involve significant overhead to the wireless network. For example, if there are M CSI-RSs and N subbands, the UE may determine and report M*N CQIs (or other CSI). Upon reception of the CSI, the BS may use processing resources to process the respective CQIs in order to perform link adaptation, scheduling, and/or the like, which may result in a delay in transmitting the downlink data. Such delay may negatively impact communication of mission-critical data such as, for example, ultra-reliable low-latency communication (URLLC) between the BS and the UE.

Various aspects of techniques and apparatuses described herein may enable reporting of subband channel quality information (CQI). In some aspects, the techniques and apparatuses described herein may enable a UE to report a subset of a total number of CQIs associated with a plurality of subbands while enabling adequate reception and decoding of downlink data (e.g., data transmitted from a BS to the UE). For example, the subset may include a set of CQIs associated with worst measurements, which may be selected from a set of CQIs associated with best measurements on each subband of the plurality of subbands, as described elsewhere herein. Reporting the subset of the number of CQIs (including the "worst best" measurements) may reduce an amount of overhead to the wireless network relative to reporting all CQIs and avoid potential delays that negatively impact communication of URLLC data from the BS to the UE. In this way, data communication between the BS and the UE may be improved.

Figure 3:
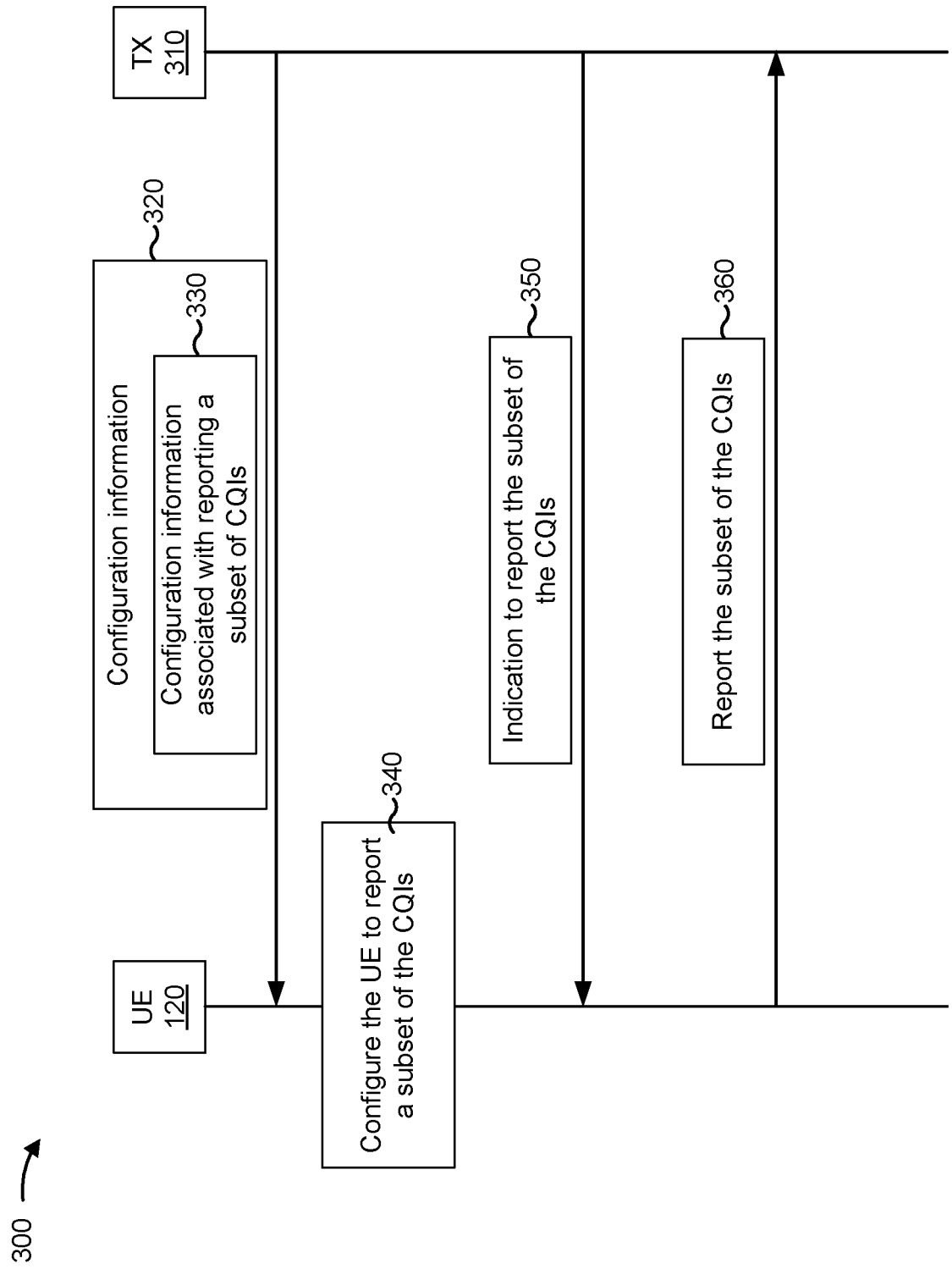
FIG. 3 is a diagram illustrating an example associated with providing subband channel quality information, in accordance with the present disclosure.

FIG. 3 is a diagram illustrating an example 300 associated with providing subband channel quality information, in accordance with the present disclosure. FIG. 3 shows a UE 120 and a transmitter (TX) 310 conducting communication in, for example, an LTE network or a 5G/NR network. The TX 310 may include a relay device or a network node such as, for example, a BS, a relay BS, a relay UE, or an integrated access and backhaul (IAB) node. The UE 120 may include one or more UEs discussed elsewhere herein, such as, for example, the UE 120 discussed with respect to FIG. 2. The communication may include downlink communications from the TX 310 to the UE 120 and may include uplink communications from the UE 120 to the TX 310. The downlink communications may include reference signals (e.g., CSI reference signals) indicating the UE to determine and report, as part of uplink communications, data (e.g., CQIs) associated with a quality of the data communication.

As shown by reference number 320, the TX 310 may transmit, and the UE 120 may receive, the configuration information. In some aspects, the UE 120 may receive the configuration information from a device other than TX 310 (e.g., from another base station). In some aspects, the UE 120 may receive the configuration information via, for example, a control channel (e.g., a physical downlink control channel) on a communication link established between the UE 120 and the TX 310. The configuration information may be communicated via radio resource control (RRC) signaling, medium access control (MAC) signaling, downlink control information (DCI), or a combination thereof (e.g., RRC or MAC configuration of a set of values for a parameter and DCI indication of a selected value of the parameter).

In some aspects, the configuration information may include an indication of, for example, one or more configuration parameters for the UE 120 to use to configure the UE 120 for the data communication. For instance, as shown by reference number 330, the configuration information may include configuration information associated with the UE 120 reporting a subset of CQIs selected from a set of CQIs associated with best channel measurements. In some aspects, the data communication between the TX 310 and the UE 120 may use a wideband frequency range, subdivided into a plurality of subbands, with each of the plurality of subbands containing a respective plurality of PRBs. The configuration information may enable the UE 120 to configure the UE 120 to determine a total number of CQIs associated with each of the respective plurality of PRBs contained within each of the plurality of subbands. In some aspects, the total number of CQIs associated with M number of PRBs contained with each of an N number of subbands may be given by M*N. In some aspects, the UE 120 may determine a CQI associated with a PRB by measuring one or more factors including, for example, a signal-to-noise ratio (SNR), a signal-to-interference-plus-noise ratio (SINR), and/or a signal-to-noise-plus-distortion ratio (SNDR) associated with a reception of downlink data utilizing the PRB.

In some aspects, the configuration information may indicate that the UE 120 is to report the subset of the total number of CQIs. The configuration information may include parameters to enable the UE 120 to determine the subset to be reported. For instance, the configuration information may include parameters to enable the UE 120 to determine a number of select CQIs, from among the total number of CQIs, that satisfy a threshold quality level associated with the data communication. In some aspects, a CQI may satisfy the threshold quality level when a channel quality indicated by the CQI is equal to or higher than the threshold quality level. In some aspects, the parameters may indicate a number of select CQIs to be determined.

Further, the configuration information may indicate that the UE 120 is to determine the subset by determining a number of reporting CQIs, from among the number of select CQIs, that fail to satisfy a threshold reporting level. In some aspects, a select CQI may fail to satisfy the threshold reporting level when a channel quality indicated by the select CQI is lower than the threshold reporting level. In some aspects, the parameters may indicate a number of reporting CQIs to be included in the subset. In some aspects, the parameters may indicate that the UE 120 is to provide a respective index associated with each reported CQI to identify the associated PRB. In some aspects, the threshold reporting level may be higher than the threshold quality level.

In some aspects, the configuration information may indicate that the UE 120 is to determine and report the subset of the number of CQIs periodically or aperiodically. For instance, the configuration information may indicate that the UE 120 is to periodically determine and report the subset of the number of CQIs at predetermined intervals of time. In some aspects, the configuration information may indicate that the UE 120 is to determine and report the subset of the number of CQIs aperiodically. For example, the configuration information may indicate that the UE 120 is to determine and report the subset of the number of CQIs aperiodically based at least in part on reception of one or more reference signals (e.g., CSI reference signals) or a triggering signal.

As shown by reference number 340, the UE 120 may configure the UE 120 to determine and report the subset of CQIs based at least in part on the configuration information. For instance, the UE 120 may configure an included controller/processor (e.g., controller/processor 280 discussed with respect to FIG. 2) to determine the CQI, the select CQIs, the reporting CQIs, and/or the subset to be reported, as discussed above with respect to FIG. 3. Further, the UE 120 may configure included reception circuitry to receive a reference signal (e.g., CSI reference signal) from the TX 310 to report the subset and configure included transmission circuitry to report (e.g., transmit) the subset to the TX 310 based at least in part on the reference signal. The reception circuitry may include, for example, one or more components (e.g., receive processor 258, MIMO detector 256, demodulator 254, and/or antennas 252). As shown by reference number 360, the UE 120 may report (e.g., transmit) the subset of the CQIs to the TX 310.

As shown by reference number 350, the UE 120 may receive the reference signal to indicate that the UE 120 is to report the subset of the CQIs to the TX 310. As discussed above, the UE 120 may receive the reference signal aperiodically. As discussed above, the UE 120 may report the subset of the CQIs periodically and/or aperiodically, such as using transmission circuitry of the UE 120. The transmission circuitry may include, for example, one or more components (e.g., transmit processor 264, TX MIMO processor 266, modulator 254, and/or antennas 252) discussed with respect to FIG. 2.

In this way, by enabling reporting of a subset of the total number of CQIs, the techniques and apparatuses described herein may enable adequate reception and decoding of downlink data and may reduce an amount of overhead associated with reporting the CQIs, while avoiding potential delays that may negatively impact communication of, for example, URLLC data. As a result, data communication between the TX and the UE may be improved.

As indicated above, FIG. 3 is provided as an example. Other examples may differ from what is described with regard to FIG. 3.

Figure 4:
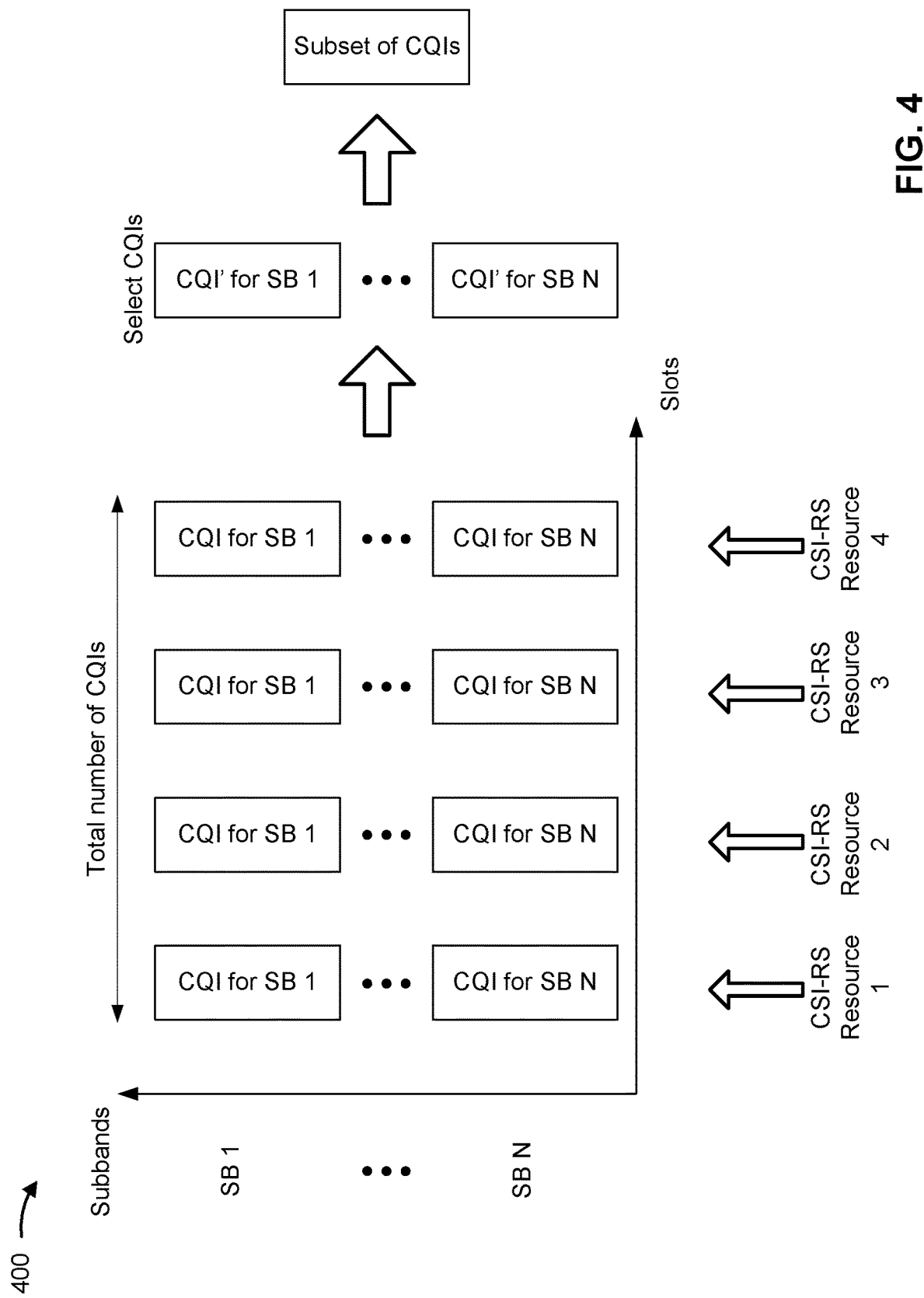
FIG. 4 is a diagram illustrating an example associated with providing subband channel quality information, in accordance with the present disclosure.

FIG. 4 is a diagram illustrating an example 400 associated with providing subband channel quality information, in accordance with the present disclosure. As discussed above with respect to FIG. 3, data communication between a TX 310 and a UE 120 may use a wideband frequency range, subdivided into a plurality of subbands. FIG. 4 shows an arrangement of the plurality of subbands (SB 1, SB 2, . . . , SB N) plotted along a vertical axis, which may represent frequency. Furthermore, a plurality of CSI-RS resources are plotted along a horizontal axis, which may represent time. In some aspects, each CSI-RS resource may span each of the plurality of subbands (SB 1, SB 2, . . . , SB N) and the plurality of CSI-RS resources may be distributed in time. The number and arrangement of subbands and/or reference signals (RSs) shown in FIG. 4 are provided as an example. In practice, there may be additional subbands and/or CSI-RSs, fewer subbands and/or CSI-RSs, different subbands and/or CSI-RSs, or differently arranged subbands and/or CSI-RSs than those shown in FIG. 4. For instance, there may be M number of CSI-RSs.

As discussed above with respect to FIG. 3, the UE 120 may receive one or more reference signals (e.g., CSI-RSs) based at least in part on which the UE 120 is to determine and report a subset of a total number of CQIs to be reported. In some aspects, the UE 120 may receive respective reference signals (RS 1, RS 2, RS 3, and RS 4) to determine CQIs. Also as discussed above with respect to FIG. 3, the UE 120 may determine a CQI by measuring one or more factors including, for example, a signal-to-noise ratio (SNR), a signal-to-interference-plus-noise ratio (SINR), and/or a signal-to-noise-plus-distortion ratio (SNDR) associated with a reception of downlink data. The UE 120 may determine a total number of CQIs including a CQI for each of the plurality of subbands containing each of the respective plurality of CSI-RSs. The total number of CQIs may include, for example, CQI for SB 1 . . . CQI for SB N for RS 1, CQI for SB 1 . . . CQI for SB N for RS 2, CQI for SB 1 . . . CQI for SB N for RS 3, and CQI for SB 1 . . . CQI for SB N for RS 4.

As discussed above with respect to FIG. 3, the UE 120 may determine a number of select CQIs from among the total number of CQIs. In some aspects, a select CQI may indicate a channel quality that satisfies a threshold quality level, as discussed above with respect to FIG. 3. In some aspects, the UE 120 may determine a single select CQI (e.g., CQI') for each subband. In some aspects, the single select CQI' may be a CQI that indicates a highest channel quality (e.g., best channel quality) among CQIs for a subband. For instance, as shown in FIG. 4, the UE 120 may determine a number of select CQI's to include, for example, a CQI' for SB 1, a CQI' for SB 2, . . . , a CQI' for SB N. In some aspects, the UE 120 may determine a plurality of select CQIs for each subband.

As discussed above with respect to FIG. 3, the UE 120 may determine a number of reporting CQIs from among the number of select CQIs. In some aspects, a reporting CQI may indicate a channel quality that fails to satisfy a threshold reporting level, as discussed above with respect to FIG. 3. In some aspects, a reporting CQI may be a CQI that indicates a lowest channel quality (e.g., worst channel quality) among the select CQIs. Thus, a "worst CQI" is a CQI associated with a lowest value of a channel quality metric among a set of CQIs, whereas a "best CQI" is a CQI associated with a highest value of a channel quality metric among a set of CQIs. In some aspects, the UE 120 may determine the subset to include one or more reporting CQIs (e.g., a worst K CQIs). In some aspects, the UE 120 and the TX 310 may communicate (e.g., transmit and/or receive) URLLC data. In such cases, it may be helpful for the UE 120 to report the worst K CQIs to enable the TX 310 to understand that the subbands for which the UE 120 does not report CQIs are associated with better CQIs (with respect to the reported worst K CQIs). As a result, the TX 310 may determine a modulation and coding (MCS) scheme (e.g., code rate) based at least in part on the reported worst K CQIs and be assured that the determined code rate would be compatible with the subbands for which the UE 120 does not report CQIs. This may enable the TX 310 to make improved scheduling decisions.

In some aspects, in addition to reporting the worst K CQIs, the UE 120 may report one or more subband indices, where each subband index indicates the associated subband. Based at least in part on information included in the one or more subband indices, the TX 310 may identify the subband(s) associated with the worst K CQIs. In some aspects, when the UE 120 reports a single worst CQI, the UE 120 may not report the subband index to indicate the associated subband. Based at least in part on receiving the single worst CQI, the TX 310 may assume that each of a remainder of the subbands has a better CQI (with respect to the reported worst CQI). In some aspects, the UE 120 may include, in the subset, a respective index to identify a PRB associated with each reporting CQI included in the subset.

As indicated above, FIG. 4 is provided as an example. Other examples may differ from what is described with regard to FIG. 4.

Figure 5:
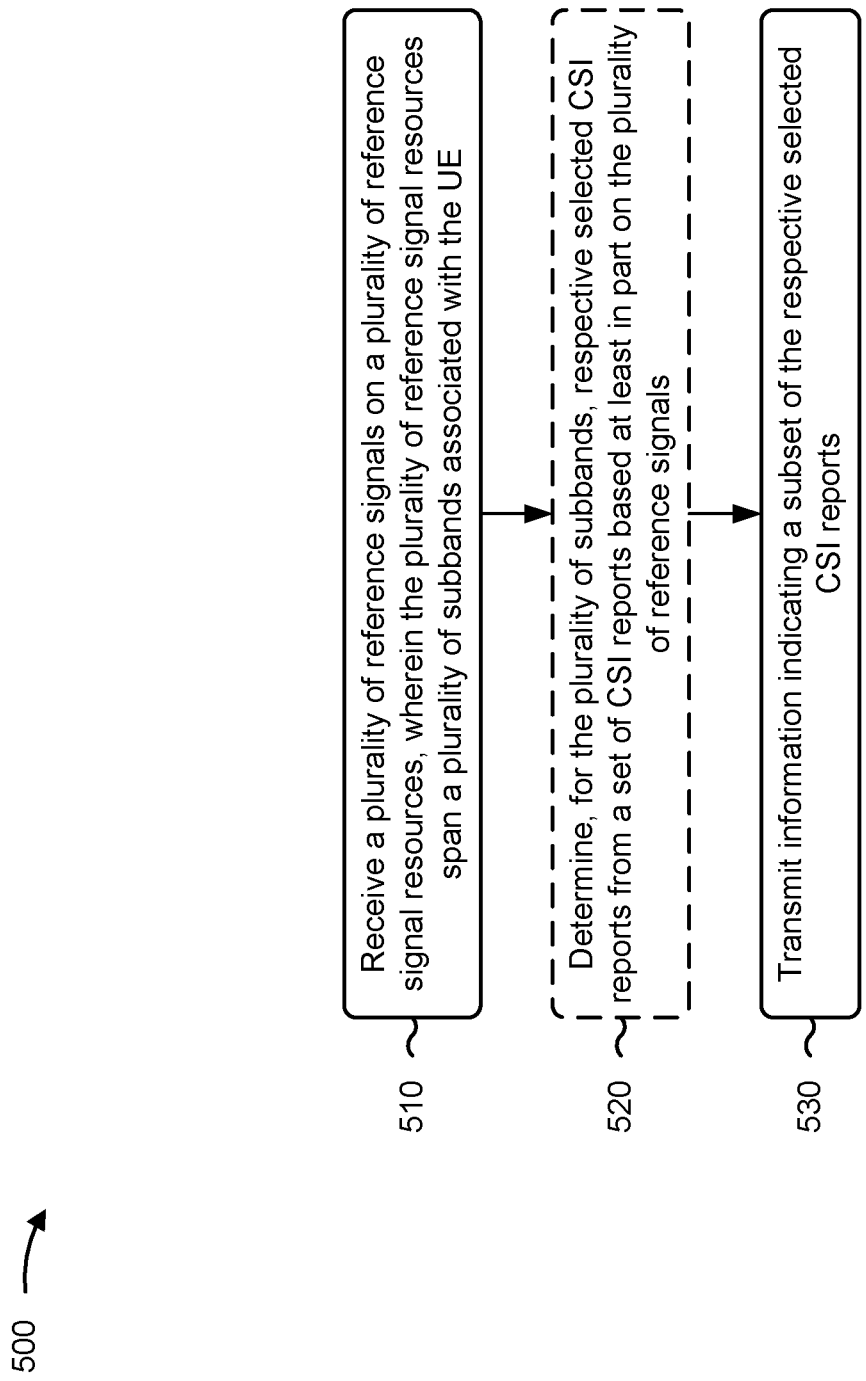
FIGS. 5 and 6 are diagrams illustrating example processes associated with providing subband channel quality information, in accordance with the present disclosure.

FIG. 5 is a diagram illustrating an example process 500 associated with providing subband channel quality information, and performed, for example, by a UE (e.g., UE 120), in accordance with the present disclosure. Example process 500 is an example where the UE performs operations associated with providing subband channel quality information.

As shown in FIG. 5, in some aspects, process 500 may include receiving a plurality of reference signals on a plurality of reference signal resources, wherein the plurality of reference signal resources span a plurality of subbands associated with the UE (block 510). For example, the UE (e.g., using reception component 702, depicted in FIG. 7) may receive a plurality of reference signals on a plurality of reference signal resources, wherein the plurality of reference signal resources span a plurality of subbands associated with the UE, as described above.

As further shown in FIG. 5, in some aspects, process 500 may optionally include determining, for the plurality of subbands, respective selected CSI reports based at least in part on the plurality of reference signals (block 520). For example, the UE (e.g., using determination component 708, depicted in FIG. 7) may determine, for the plurality of subbands, respective selected CSI reports from a set of CSI reports based at least in part on the plurality of reference signals, as described above.

As further shown in FIG. 5, in some aspects, process 500 may include transmitting information indicating a subset of the respective selected CSI reports (block 530). For example, the UE (e.g., using transmission component 704, depicted in FIG. 7) may transmit information indicating a subset of the respective selected CSI reports, as described above.

Process 500 may include additional aspects, such as any single aspect or any combination of aspects described below and/or in connection with one or more other processes described elsewhere herein.

In a first aspect, the respective selected CSI reports include a best measurement on each subband of the plurality of subbands.

In a second aspect, alone or in combination with the first aspect, the subset of the respective selected CSI reports includes a set of worst CSI reports of the respective selected CSI reports.

In a third aspect, alone or in combination with one or more of the first and second aspects, process 500 includes receiving configuration information indicating a number of CSI reports included in the set of worst CSI reports.

In a fourth aspect, alone or in combination with one or more of the first through third aspects, the information indicating a subset of the respective selected CSI reports identifies one or more reference signal resources, of the plurality of reference signal resources, associated with the subset of the respective selected CSI reports.

In a fifth aspect, alone or in combination with one or more of the first through fourth aspects, the subset of the respective selected CSI reports is a proper subset of the respective selected CSI reports.

In a sixth aspect, alone or in combination with one or more of the first through fifth aspects, determining the respective selected CSI reports further comprises determining respective CSI reports for each subband of the plurality of subbands with respect to each reference signal resource of the plurality of reference signal resources, and selecting the respective selected CSI reports from the respective CSI reports.

In a seventh aspect, alone or in combination with one or more of the first through sixth aspects, the respective selected CSI reports comprise channel quality information.

In an eighth aspect, alone or in combination with one or more of the first through seventh aspects, the information indicating the subset of the respective selected CSI reports is transmitted via a channel state information report.

In a ninth aspect, alone or in combination with one or more of the first through eighth aspects, the plurality of reference signals comprise a plurality of channel state information reference signals.

In a tenth aspect, alone or in combination with one or more of the first through ninth aspects, the subset of the respective selected CSI reports includes a set of worst CSI reports of the respective selected CSI reports across all subbands and a set of subband indices that indicate subbands associated with the worst CSI reports.

In an eleventh aspect, alone or in combination with one or more of the first through tenth aspects, the subset of the respective selected CSI reports includes a single worst CSI report of the respective selected CSI reports across all subbands.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
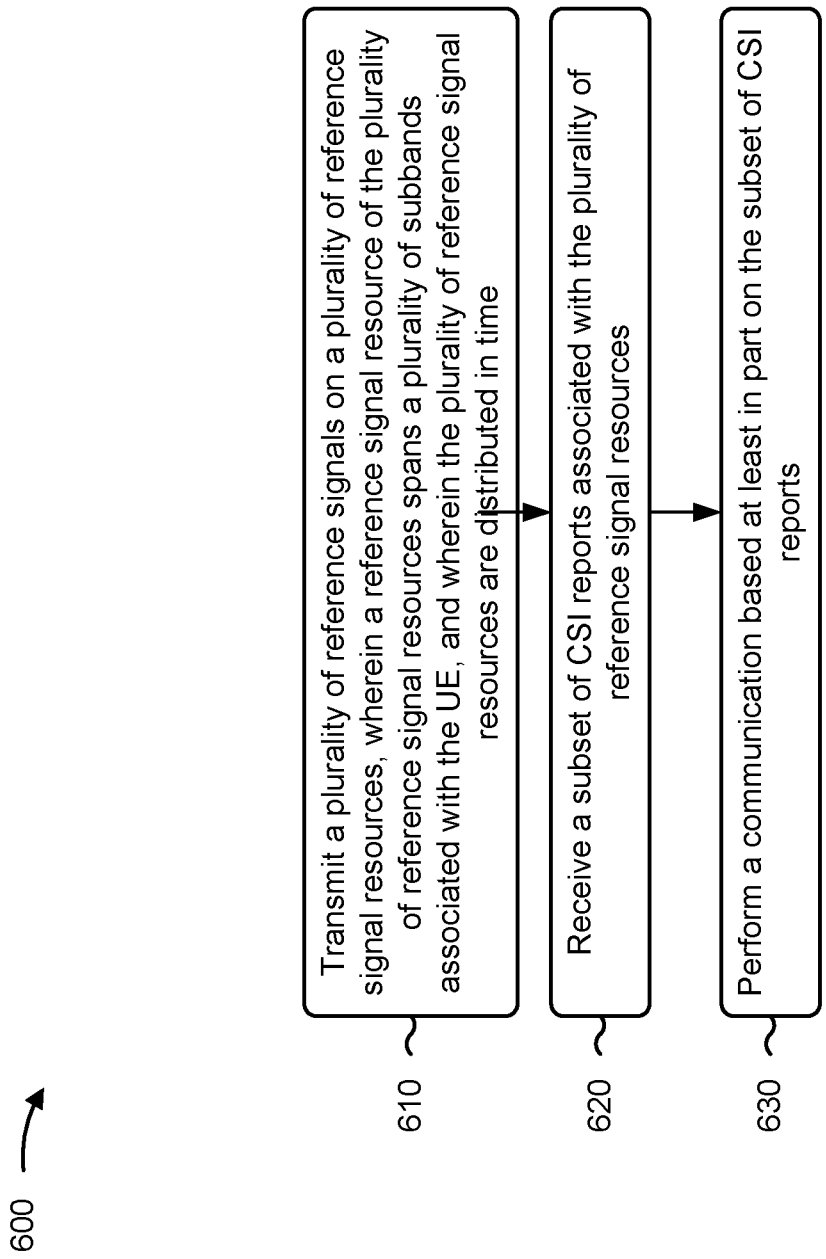

FIG. 6 is a diagram illustrating an example process 600 associated with providing subband channel quality information, and performed, for example, by a transmitter (e.g., TX 310), in accordance with the present disclosure. Example process 600 is an example where the base station performs operations associated with providing subband channel quality information.

As shown in FIG. 6, in some aspects, process 600 may include transmitting a plurality of reference signals on a plurality of reference signal resources, wherein a reference signal resource of the plurality of reference signal resources spans a plurality of subbands associated with the UE, and wherein the plurality of reference signal resources are distributed in time (block 610). For example, the transmitter (e.g., using transmission component 804, depicted in FIG. 8) may transmit a plurality of reference signals on a plurality of reference signal resources, as described above. A reference signal resource of the plurality of reference signal resources may span a plurality of subbands associated with the UE. The plurality of reference signal resources may be distributed in time.

As further shown in FIG. 6, in some aspects, process 600 may include receiving a subset of CSI reports selected from a set of CSI reports associated with the plurality of reference signal resources (block 620). For example, the transmitter (e.g., using reception component 802, depicted in FIG. 8) may receive a subset of CSI reports selected from a set of CSI reports associated with the plurality of reference signal resources, as described above.

As further shown in FIG. 6, in some aspects, process 600 may include performing a communication based at least in part on the subset of the CSI reports (block 630). For example, the transmitter (e.g., using operation component 808, depicted in FIG. 8) may perform a communication based at least in part on the subset of CSI reports, as described above.

Process 600 may include additional aspects, such as any single aspect or any combination of aspects described below and/or in connection with one or more other processes described elsewhere herein.

In a first aspect, the subset of CSI reports is selected from a set of CSI reports including a best measurement on each subband of the plurality of subbands.

In a second aspect, alone or in combination with the first aspect, the subset of CSI reports includes a set of worst CSI reports of the set of CSI reports.

In a third aspect, alone or in combination with one or more of the first and second aspects, process 600 includes transmitting configuration information indicating a number of CSI reports included in the subset of CSI reports.

In a fourth aspect, alone or in combination with one or more of the first through third aspects, the subset of CSI reports identifies one or more reference signal resources, of the plurality of reference signal resources, associated with the subset of CSI reports.

In a fifth aspect, alone or in combination with one or more of the first through fourth aspects, the subset of CSI reports is a proper subset of the CSI reports associated with the plurality of reference signals and the plurality of subbands.

In a sixth aspect, alone or in combination with one or more of the first through fifth aspects, the CSI reports comprise channel quality information.

In a seventh aspect, alone or in combination with one or more of the first through sixth aspects, the subset of CSI reports is received via a channel state information report.

In an eighth aspect, alone or in combination with one or more of the first through seventh aspects, the plurality of reference signals comprise a plurality of channel state information reference signals.

In a ninth aspect, alone or in combination with one or more of the first through eighth aspects, the communication is associated with a reliability requirement or a latency requirement corresponding to an ultra-reliable or low latency communication.

In a tenth aspect, alone or in combination with one or more of the first through ninth aspects, the subset of the respective selected CSI reports includes a set of worst CSI reports of the respective selected CSI reports across all subbands and a set of subband indices that indicate subbands associated with the worst CSI reports.

In an eleventh aspect, alone or in combination with one or more of the first through tenth aspects, the subset of the respective selected CSI reports includes a single worst CSI report of the respective selected CSI reports across all subbands.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
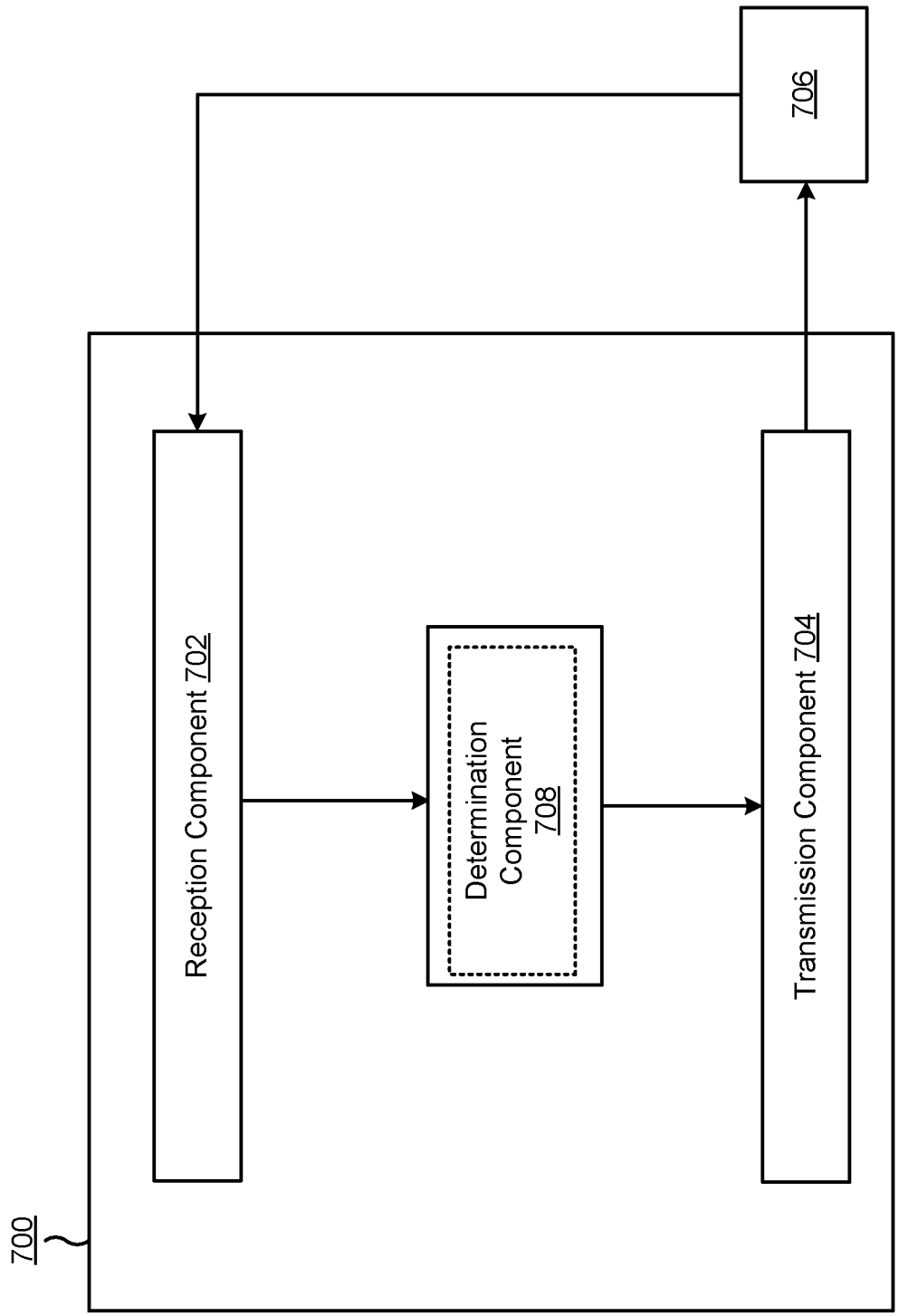
FIGS. 7 and 8 are diagrams illustrating example apparatuses associated with providing subband channel quality information, in accordance with the present disclosure.

FIG. 7 is a block diagram of an example apparatus 700 associated with providing subband channel quality information. The apparatus 700 may be a UE (e.g., UE 120), or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, a transmitter, or another wireless communication device) using the reception component 702 and the transmission component 704. As further shown, the apparatus 700 may include a determination component 708, among other examples.

In some aspects, the apparatus 700 may be configured to perform one or more operations described herein in connection with FIGS. 3 and 4. Additionally or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive a plurality of reference signals on a plurality of reference signal resources, wherein the plurality of reference signal resources span a plurality of subbands associated with the UE. The determination component 708 may determine, for the plurality of subbands, respective selected CSI reports from a set of CSI reports based at least in part on the plurality of reference signals. In some aspects, the determination component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 704 may transmit information indicating a subset of the respective selected CSI reports.

The reception component 702 may receive configuration information indicating a number of CSI reports included in a set of worst CSI reports.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
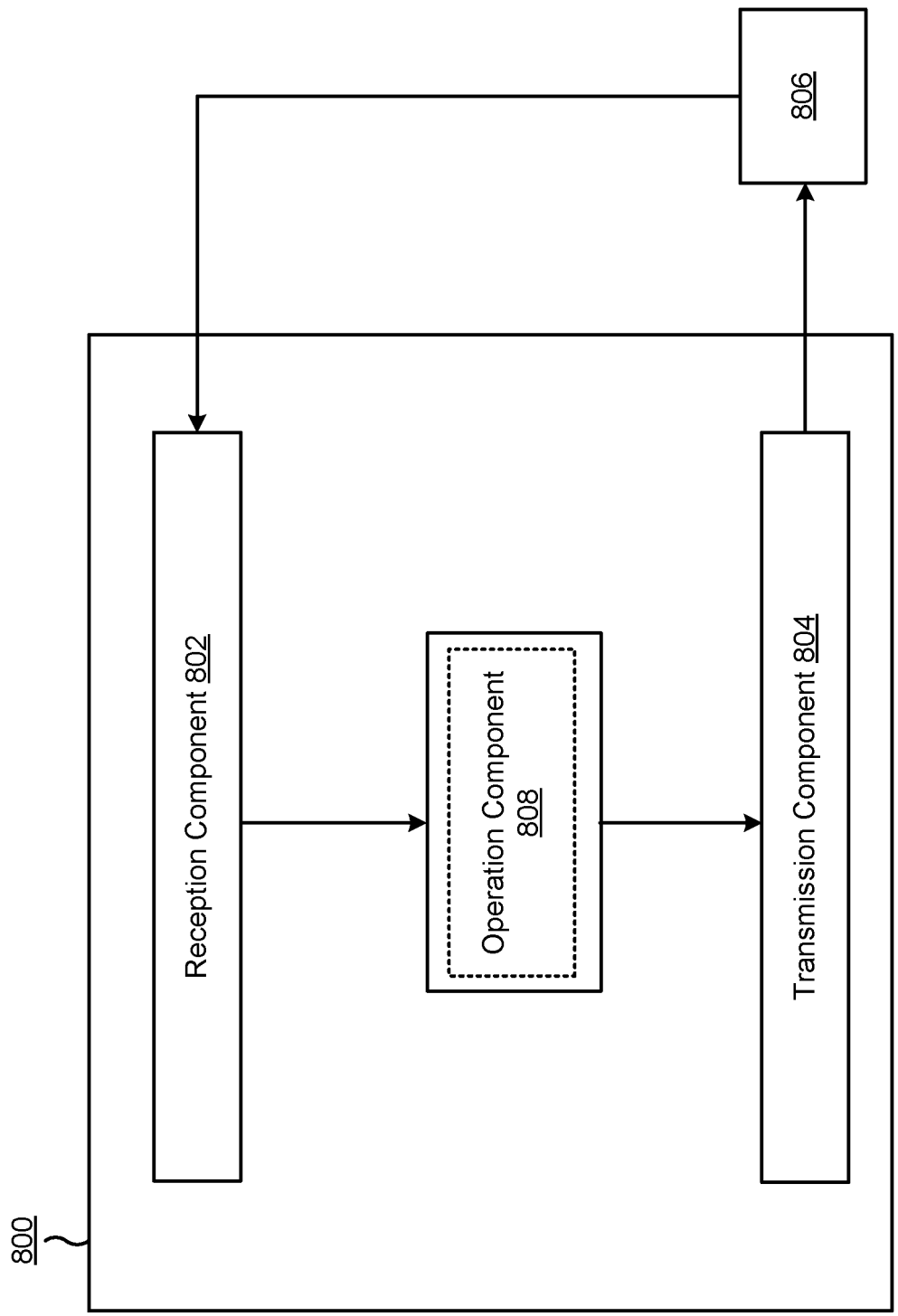

FIG. 8 is a block diagram of an example apparatus 800 associated with providing subband channel quality information. The apparatus 800 may be a transmitter (e.g., TX 310), or a transmitter may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include an operation component 808, among other examples.

In some aspects, the apparatus 800 may be configured to perform one or more operations described herein in connection with FIGS. 3 and 4. Additionally or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit a plurality of reference signals on a plurality of reference signal resources, wherein the plurality of reference signal resources span a plurality of subbands. The reception component 802 may receive information indicating a subset of CSI reports associated with the plurality of reference signals and the plurality of subbands. The operation component 808 may perform a communication based at least in part on the subset of CSI reports. In some aspects, the operation component 808 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The transmission component 804 may transmit configuration information indicating a number of CSI reports included in the subset of CSI reports.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a plurality of reference signals on a plurality of reference signal resources, wherein a reference signal resource of the plurality of reference signal resources spans a plurality of subbands associated with the UE, and wherein the plurality of reference signal resources are distributed in time; and transmitting, for the plurality of subbands, a subset of respective selected CSI reports, wherein the respective selected CSI reports are selected based at least in part on the plurality of reference signals.

Aspect 2: The method of Aspect 1, wherein the respective selected CSI reports include a best CSI report on each subband of the plurality of subbands.

Aspect 3: The method of any of Aspects 1-2, wherein the subset of the respective selected CSI reports includes a set of worst CSI reports of the respective selected CSI reports across all subbands.

Aspect 4: The method of Aspect 3, further comprising: receiving configuration information indicating a number of CSI reports included in the set of worst CSI reports.

Aspect 5: The method of any of Aspects 1-4, wherein the subset of the respective selected CSI reports identifies one or more reference signal resources, of the plurality of reference signal resources, associated with the subset of the respective selected CSI reports.

Aspect 6: The method of any of Aspects 1-5, wherein the subset of the respective selected CSI reports is a proper subset of the respective selected CSI reports.

Aspect 7: The method of any of Aspects 1-6, wherein determining the respective selected CSI reports further comprises: determining respective CSI reports for each subband of the plurality of subbands with respect to each reference signal resource of the plurality of reference signal resources; and selecting the respective selected CSI reports from the respective CSI reports.

Aspect 8: The method of any of Aspects 1-7, wherein the respective selected CSI reports comprise channel quality information.

Aspect 9: The method of any of Aspects 1-8, wherein the subset of the respective selected CSI reports is transmitted via a channel state information report.

Aspect 10: The method of any of Aspects 1-9, wherein the plurality of reference signals comprise a plurality of channel state information reference signals.

Aspect 11: The method of any of Aspects 1-10, wherein the subset of the respective selected CSI reports includes a set of worst CSI reports of the respective selected CSI reports across all subbands and a set of subband indices that indicate subbands associated with the worst CSI reports.

Aspect 12: The method of any of Aspects 1-11, wherein the subset of the respective selected CSI reports includes a single worst CSI report of the respective selected CSI reports across all subbands.

Aspect 13: A method of wireless communication performed by a transmitter, comprising: transmitting, to a user equipment (UE), a plurality of reference signals on a plurality of reference signal resources, wherein a reference signal resource of the plurality of reference signal resources spans a plurality of subbands associated with the UE, and wherein the plurality of reference signal resources are distributed in time; receiving a subset of CSI reports selected from a set of CSI reports associated with the plurality of reference signal resources; and performing a communication operation based at least in part on the subset of CSI reports.

Aspect 14: The method of Aspect 13, wherein the set of CSI reports includes a best measurement on each subband of the plurality of subbands.

Aspect 15: The method of Aspect 14, wherein the subset of CSI reports includes a set of worst CSI reports of the set of CSI reports.

Aspect 16: The method of any of Aspects 13-15, further comprising: transmitting configuration information indicating a number of CSI reports included in the subset of CSI reports.

Aspect 17: The method of any of Aspects 13-16, wherein the subset of CSI reports identifies one or more reference signal resources, of the plurality of reference signal resources, associated with the subset of CSI reports.

Aspect 18: The method of any of Aspects 13-17, wherein the subset of CSI reports is a proper subset of the set of CSI reports.

Aspect 19: The method of any of Aspects 13-18, wherein the CSI reports comprise channel quality information.

Aspect 20: The method of any of Aspects 13-19, wherein the subset of CSI reports is received via a channel state information report.

Aspect 21: The method of any of Aspects 13-20, wherein the plurality of reference signals comprise a plurality of channel state information reference signals.

Aspect 22: The method of any of Aspects 13-21, wherein the communication is associated with a reliability requirement or a latency requirement corresponding to an ultra-reliable or low latency communication.

Aspect 23: The method of any of Aspects 13-22, wherein the subset of CSI reports includes a set of worst CSI reports of the set of CSI reports and a set of subband indices that indicate subbands associated with the set of worst CSI reports.

Aspect 24: The method of any of Aspects 13-23, wherein the subset of CSI reports includes a single worst CSI report.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, the one or more processors individually or collectively configured to:
receive configuration information associated with transmitting a subset of respective selected channel state information (CSI) reports,
wherein the configuration information indicates a first number of CSI reports to be selected from a total number of CSI reports to form a group of CSI reports and a second number of CSI reports to be selected from the group of CSI reports to form the subset of respective selected CSI reports, and
wherein the second number is smaller than the first number;
receive a plurality of reference signals on a plurality of reference signal resources,
wherein a reference signal resource of the plurality of reference signal resources spans a plurality of subbands associated with the UE, and
wherein the plurality of reference signal resources are distributed in time; and
transmit, for the plurality of subbands, the subset of respective selected CSI reports, wherein the respective selected CSI reports include the first number of CSI reports selected from the total number of CSI reports selected for each subband that satisfy a threshold quality level, and wherein the subset of the respective selected CSI reports includes the second number of CSI reports, selected from the group of CSI reports, that fails to satisfy a threshold reporting level, wherein the threshold reporting level is higher than the threshold quality level.

2. The apparatus of claim 1, wherein the respective selected CSI reports include a best CSI report on each subband of the plurality of subbands.

3. The apparatus of claim 1, wherein the configuration information configures the UE to determine a total number of channel quality indicators for each of a respective plurality of physical resource blocks within each subband of the plurality of subbands.

4. The apparatus of claim 1, wherein the subset of the respective selected CSI reports identifies one or more reference signal resources, of the plurality of reference signal resources, associated with the subset of the respective selected CSI reports.

5. The apparatus of claim 1, wherein the subset of the respective selected CSI reports is a proper subset of the respective selected CSI reports.

6. The apparatus of claim 1, wherein the one or more processors, to determine the respective selected CSI reports, are configured to:
determine respective CSI reports for each subband of the plurality of subbands with respect to each reference signal resource of the plurality of reference signal resources; and
select the respective selected CSI reports from the respective CSI reports.

7. The apparatus of claim 1, wherein the respective selected CSI reports comprise channel quality information.

8. The apparatus of claim 1, wherein the subset of the respective selected CSI reports is transmitted via a channel state information report.

9. The apparatus of claim 1, wherein the plurality of reference signals comprise a plurality of channel state information reference signals.

10. The apparatus of claim 1, wherein the subset of the respective selected CSI reports includes a set of worst CSI reports of the respective selected CSI reports across all subbands and a set of subband indices that indicate subbands associated with the set of worst CSI reports.

11. The apparatus of claim 1, wherein the subset of the respective selected CSI reports includes a single worst CSI report of the respective selected CSI reports across all subbands.

12. An apparatus for wireless communication at a transmitter, comprising:
one or more memories; and
one or more processors, coupled to the one or more memories, the one or more processors individually or collectively configured to:
transmit, to a user equipment (UE), configuration information associated with transmitting a subset of channel state information (CSI) reports,
wherein the configuration information indicates a first number of CSI reports to be selected from a total number of CSI reports to form a group of CSI reports and a second number of CSI reports to be selected from the group of CSI reports to form the subset of CSI reports, and
wherein the second number is smaller than the first number;
transmit a plurality of reference signals on a plurality of reference signal resources, wherein a reference signal resource of the plurality of reference signal resources spans a plurality of subbands associated with the UE, and wherein the plurality of reference signal resources are distributed in time;
receive the subset of CSI reports selected from the group of CSI reports associated with the plurality of reference signal resources, wherein the subset of CSI reports includes the second number of CSI reports having a lowest channel quality of the group of CSI reports, and wherein the group of CSI reports include one or more CSI reports for each subband that satisfies a threshold quality level, wherein the threshold reporting level is higher than the threshold quality level; and
perform a communication based at least in part on the subset of CSI reports.

13. The apparatus of claim 12, wherein the group of CSI reports includes a best measurement on each subband of the plurality of subbands.

14. The apparatus of claim 12, wherein the configuration information configures the UE to determine a total number of channel quality indicators for each of a respective plurality of physical resource blocks within each subband of the plurality of subbands.

15. The apparatus of claim 12, wherein the subset of CSI reports identifies one or more reference signal resources, of the plurality of reference signal resources, associated with the subset of CSI reports.

16. The apparatus of claim 12, wherein the subset of CSI reports is a proper subset of the group of CSI reports.

17. The apparatus of claim 12, wherein the group of CSI reports comprise channel quality information.

18. The apparatus of claim 12, wherein the subset of CSI reports is received via a channel state information report.

19. The apparatus of claim 12, wherein the plurality of reference signals comprise a plurality of channel state information reference signals.

20. The apparatus of claim 12, wherein the communication is associated with a reliability requirement or a latency requirement corresponding to an ultra-reliable or low latency communication.

21. The apparatus of claim 12, wherein the subset of CSI reports includes a set of worst CSI reports of the group of CSI reports and a set of subband indices that indicate subbands associated with the subset of CSI reports.

22. The apparatus of claim 12, wherein the subset of CSI reports includes a single worst CSI report.

23. A method of wireless communication performed by a user equipment (UE), comprising:
   receiving configuration information associated with transmitting a subset of respective selected channel state information (CSI) reports,
      wherein the configuration information indicates a first number of CSI reports to be selected from a total number of CSI reports to form a group of CSI reports and a second number of CSI reports to be selected from the group of CSI reports to form the subset of respective selected CSI reports, and
      wherein the second number is smaller than the first number;
   receiving a plurality of reference signals on a plurality of reference signal resources, wherein a reference signal resource of the plurality of reference signal resources spans a plurality of subbands associated with the UE, and wherein the plurality of reference signal resources are distributed in time; and
   transmitting, for the plurality of subbands, the subset of respective selected CSI reports, wherein the respective selected CSI reports include the first number of CSI reports selected from the total number of CSI reports selected for each subband that satisfy a threshold quality level, and wherein the subset of the respective selected CSI reports includes the second number of CSI reports, selected from the group of CSI reports, that fails to satisfy a threshold reporting level, wherein the threshold reporting level is higher than the threshold quality level.

24. The method of claim 23, wherein the respective selected CSI reports include a best CSI report on each subband of the plurality of subbands.

25. The method of claim 23, wherein the subset of the respective selected CSI reports identifies one or more reference signal resources, of the plurality of reference signal resources, associated with the subset of the respective selected CSI reports.

26. The method of claim 23, wherein the subset of the respective selected CSI reports is a proper subset of the respective selected CSI reports.

27. The method of claim 23, wherein determining the respective selected CSI reports comprises:
   determining respective CSI reports for each subband of the plurality of subbands with respect to each reference signal resource of the plurality of reference signal resources; and
   selecting the respective selected CSI reports from the respective CSI reports.

28. A method of wireless communication performed by a transmitter, comprising:
   transmitting, to a user equipment (UE), configuration information associated with transmitting a subset of channel state information (CSI) reports,
      wherein the configuration information indicates a first number of CSI reports to be selected from a total number of CSI reports to form a group of CSI reports and a second number of CSI reports to be selected from the group of CSI reports to form the subset of CSI reports, and
      wherein the second number is smaller than the first number;
   transmitting a plurality of reference signals on a plurality of reference signal resources, wherein a reference signal resource of the plurality of reference signal resources spans a plurality of subbands associated with the UE, and wherein the plurality of reference signal resources are distributed in time;
   receiving the subset of CSI reports selected from the group of CSI reports associated with the plurality of reference signal resources, wherein the subset of CSI reports includes the second number of CSI reports having a lowest channel quality of the group of CSI reports, and wherein the group of CSI reports include one or more CSI reports for each subband that satisfies a threshold quality level, wherein the threshold reporting level is higher than the threshold quality level; and
   performing a communication based at least in part on the subset of CSI reports.

29. The method of claim 28, wherein the group of CSI reports includes a best measurement on each subband of the plurality of subbands.

30. The method of claim 28, wherein the subset of CSI reports identifies one or more reference signal resources, of the plurality of reference signal resources, associated with the subset of CSI reports.

* * * * *